(12) United States Patent
Noguchi et al.

(10) Patent No.: US 9,131,031 B2
(45) Date of Patent: Sep. 8, 2015

(54) VIRTUAL COMPUTER SYSTEM, VIRTUAL COMPUTER MANAGEMENT PROGRAM, AND MAC ADDRESS MANAGEMENT METHOD

(75) Inventors: Ryota Noguchi, Hadano (JP); Yuta Sawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 13/614,567

(22) Filed: Sep. 13, 2012

(65) Prior Publication Data
US 2013/0148669 A1 Jun. 13, 2013

(30) Foreign Application Priority Data
Dec. 8, 2011 (JP) ................................. 2011-269225

(51) Int. Cl.
H04L 29/12 (2006.01)
H04L 12/931 (2013.01)
G06F 9/50 (2006.01)
G06F 9/455 (2006.01)

(52) U.S. Cl.
CPC ........ H04L 61/6022 (2013.01); G06F 9/45558 (2013.01); G06F 9/5077 (2013.01); H04L 49/70 (2013.01); H04L 61/2038 (2013.01); G06F 2009/45595 (2013.01)

(58) Field of Classification Search
None
See application file for complete search history.

(56) References Cited

U.S. PATENT DOCUMENTS 7,769,031 B2 8/2010 Mitome et al.
8,028,184 B2 9/2011 Sekiguchi et al.
8,271,977 B2 9/2012 Ikegaya et al.
2006/0182145 A1* 8/2006 Seo et al. ........................ 370/471
2006/0221961 A1* 10/2006 Basso et al. .................... 370/390
2007/0283015 A1* 12/2007 Jackson et al. ................ 709/226
2010/0031258 A1 2/2010 Takano et al.
2011/0016235 A1 1/2011 Brinkmann et al.
2011/0138058 A1* 6/2011 Ishida ............................ 709/227
2012/0089713 A1* 4/2012 Carriere ........................ 709/222
2013/0086266 A1* 4/2013 Gai et al. ...................... 709/225

FOREIGN PATENT DOCUMENTS

JP 2000-259434 A 9/2000
JP 2007-158870 A 6/2007
JP 2008-305034 A 12/2008

(Continued)

OTHER PUBLICATIONS

Japanese Office Action received in Japanese Application No. 2011-269225 dated Feb. 25, 2014.

*Primary Examiner* — Jutai Kao
(74) *Attorney, Agent, or Firm* — Mattingly & Malur, PC (57) ABSTRACT

The virtual computer system comprises a network device which is capable of being coupled via a network to an external network apparatus and is able to operate multiple virtual computers. The network device comprises multiple communication ports which can be provided to a virtual computer with respect to a single physical communication port. When a certain the above-mentioned virtual computer is booted up, the virtual computer system acquires a MAC address corresponding to the above-mentioned certain virtual computer from multiple MAC addresses, which correspond to each of multiple the above-mentioned virtual computers and are allocated to the virtual communication port provided in the virtual computer, and configures this MAC address as the MAC address of the virtual communication port allocated to the above-mentioned certain virtual computer.

8 Claims, 10 Drawing Sheets

(56) References Cited

FOREIGN PATENT DOCUMENTS

| JP | 2010-033403 A | 2/2010 |
| JP | 2010-33404 A | 2/2010 |
| JP | 2011-517497 A | 6/2011 |

* cited by examiner

VIRTUAL COMPUTER SYSTEM, VIRTUAL COMPUTER MANAGEMENT PROGRAM, AND MAC ADDRESS MANAGEMENT METHOD

CROSS-REFERENCE TO PRIOR APPLICATION

This application relates to and claims the benefit of priority from Japanese Patent Application No. 2011-269255 filed on Dec. 8, 2011, the entire disclosure of which is incorporated herein by reference.

BACKGROUND

The present invention generally relates to technology for managing a MAC address of a logical network device when a physical network device is shared by multiple virtual computers.

A virtual computer system for operating multiple virtual computers is known. A virtual computer system having a hypervisor, which manages the multiple virtual computers, is known as such a computer system (for example, refer to Japanese Patent Application Laid-open No. 2000-259434).

A method for realizing a technology via which a physical network device is shared by multiple virtual computers by disposing a virtual network device on a virtual computer is known (For example, refer to Japanese Patent Application Laid-open No. 2007-158870).

The characteristic feature of a sharing technology, which provides such a virtual network device, is that the virtual computer itself generally provides a virtual computer-side virtual network device MAC address, which is separate from the MAC address of the physical network device, so as to enable the exact same MAC address to continue to be used on the virtual computer without changing the configuration of the OS (Operating System) and so forth even when the physical network device has been replaced with a different unit due to a malfunction or the like.

A technology, which uses a function by which the virtual computer manages the network device MAC address and allows the virtual computer to be migrated to and run on a physically different computer by copying the configuration data of the virtual computer, which includes the virtual network device MAC address, has also been proposed and is currently being used (For example, refer to Japanese Patent Application Laid-open No. 2010-33404).

However, in a network device sharing technology like that disclosed in Japanese Patent Application Laid-open No. 2007-158870, the enormous throughput of the physical computer CPU (Central Processing Unit) limits the performance of the virtual computer network device, a problem which has become pronounced in line with improvements in physical network device throughput in recent years.

To overcome this problem, technologies, which support the physical network device being shared by multiple virtual computers, can be implemented on the physical network device side. Of these technologies, a virtualization technology called SR-IOV (Single Root Input/Output Virtualization), which places an extremely low load on the CPU, is known (For example, refer to Japanese Translation of PCT Application No. 2011-517497).

The following processing is generally performed in a case where the SR-IOV technology is used so that a physical network device is shared by multiple virtual computers.

First, a PF port, which is a physical network port resource of the SR-IOV, is allocated to either a host OS or a hypervisor (virtual computer monitor) itself, or to a dedicated virtual computer for management use, and device initialization processing and the like is performed using a vendor-provided PF driver.

Then, a VF port, which is a virtual network port resource, is allocated to each virtual computer, and communication processing is performed using a vendor-provided VF driver. At the time of this communication processing, the VF driver reads and writes a control register of the VF port, which is mapped to a memory address of the virtual computer system. In this processing, it is possible to read and write these registers from the CPU on the virtual computer without any intervention on the part of the hypervisor. Because the driver (the CPU, which executes the driver) is able to access a required H/W (hardware) register like this without the intervention of the hypervisor, the sharing of a network device using the SR-IOV technology has an advantage over previous technologies in that network device sharing can be realized with an extremely low load being placed on the CPU.

SUMMARY

However, in a physical network device sharing method, which uses the SR-IOV technology, the physical network device is recognized as-is by the guest OS of the virtual computer. For example, since the network device MAC address of a VF port used by each virtual computer is a unique MAC address, which is provided by the relevant H/W vendor for VF port use, in a case where the network device malfunctions and is replaced with a different unit, the VF port MAC address visible to the respective virtual computers will change.

There are also cases in which the VF port MAC address used by the H/W vendor providing the physical network device is not a unique value reserved by the vendor, but rather is a value created randomly when the power is turned ON. When using a network device, which supports SR-IOV like this, the network device MAC address of the VF port on the virtual computer visibly changes each time, and, although the probability is low, this MAC address could duplicate another network device MAC address, making communications impossible.

That is, in a case where a physical network device-provided VF port MAC address is used when using the SR-IOV function to share a network device on a virtual computer system, the virtual computer VF port MAC address will change when the physical network device is replaced due to a malfunction, or when the virtual computer is migrated to a different physical computer, making it difficult to replace a malfunctioning physical network device and generating a failure when the virtual computer is migrated to a different physical computer.

There needs to be the ability for a MAC address, which is prepared as the VF port MAC address by the hypervisor for each virtual computer, to be able to be used on a VF port, which has been allocated to a virtual computer, without the user performing a special operation while still enjoying the advantages of low CPU load resulting from the non-intervention of the hypervisor (virtual computer monitor) in the sharing of a network device using the SR-IOV function.

With the foregoing problem in view, an object of the present invention is to provide a technology, which enables multiple VF port MAC addresses to be managed using an appropriate MAC address.

As a simple method for solving the above-described problem, in the initialization process at the time the hypervisor boots up a virtual computer, a MAC address reserved by the hypervisor for this virtual computer could be configured via the PF driver in the VF port used by this virtual computer.

However, the problem is that, in a case where the association of the VF port with the virtual computer is not fixed when this simple solution is employed, the MAC address of the operational VF port and the MAC address of a non-operational VF port could become redundant, making normal communications impossible. Alternatively, when the association between the virtual computer and the VF port has been fixed, it could become impossible to associate the virtual computer with the corresponding VF port in a case where the virtual computer is migrated to a different virtual computer system.

Consequently, the virtual computer system comprises a network device comprising multiple communication ports, which are capable of being coupled via a network to an external network apparatus and can be provided to a virtual computer with respect to a single physical communication port, and when a certain the above-mentioned virtual computer is booted up, a MAC address corresponding to the above-mentioned certain virtual computer is acquired from multiple MAC addresses, which correspond to each of multiple the above-mentioned virtual computers and are allocated to the virtual communication port provided in the virtual computer, and this MAC address is configured as the MAC address of the virtual communication port allocated to the above-mentioned certain virtual computer.

Since the MAC address, which is reserved as virtual computer configuration information is used when managing the MAC address of this virtual communication port (VF port), for example, it is possible to provide a virtual computer system, which is not affected by a change in the VF port MAC address provided by the H/W vendor. Also, for example, the adverse affects resulting from a H/W vendor-provided VF port MAC address being changed can be appropriately prevented when the physical network device is replaced or when the virtual computer is migrated to a different computer system.

DESCRIPTION OF THE EMBODIMENTS

An example will be explained by referring to the drawings. The example explained hereinbelow does not limit the invention related to the claims, and not all of the elements and combinations thereof explained in the example are essential to the solution provided by the invention.

In the following explanation, there may be cases where the processing is explained using a program or a program module as the doer of the action, but the stipulated processing can be performed in accordance with a program or program module being executed by a processor (for example, a CPU (Central Processing Unit)) while using a storage resource (for example, a memory) and/or a communication interface device (for example, a network device) as needed. For this reason, processing, which is explained having a program or a program module as the doer of the action may be processing performed by a processor or a control device or system (for example, a virtual computer system) comprising this processor. The control device may include a hardware circuit, which performs either all or part of the processing performed by the processor. A program may be installed from a program source. The program source, for example, may be either a program distribution server or a storage medium.

The example will be explained below using the drawings.

Figure 1:
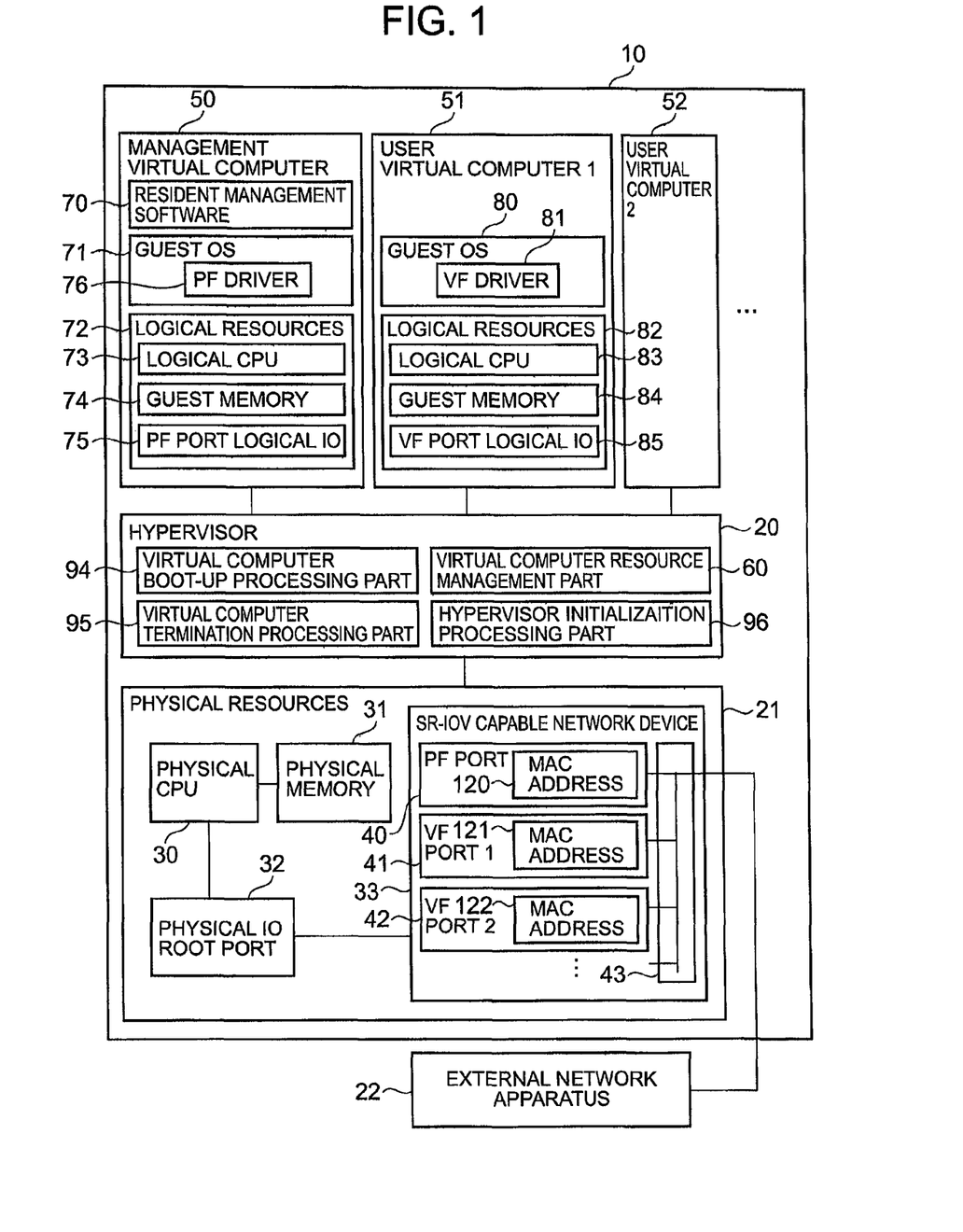
FIG. 1 is a conceptual block diagram of a virtual computer system related to an example.

FIG. 1 is a conceptual block diagram of a virtual computer system related to the example.

A virtual computer system 10 includes a physical resource (hardware resource) 21. The physical resource 21, for example, includes a physical CPU 30 as an example of a processor, a physical memory 31, a physical IO root port 32, and a SR-IOV capable network device 33. The physical CPU 30 performs various types of processing in accordance with executing programs stored in the physical memory 31. The physical memory 31 stores programs, which is executed by the physical CPU 30, and data.

The SR-IOV capable network device 33 comprises a PF port 40, which is a physical network port (physical communication port), and VF ports 41 (VF port 1) and 42 (VF port 2), which are virtual network ports (virtual communication ports). The PF port 40 and the VF ports 41 and 42 can be coupled to an external network apparatus (for example, a computer) 22 via an internal network switch 43. The PF port 40 stores a MAC address 120 for the PF port. The VF ports 41 and 42 each store a VF port MAC address 121 and 122.

A hypervisor (virtual computer monitor) 20 runs on the physical resource 21. The hypervisor 20 is configured in accordance with the physical CPU 30 executing a hypervisor program, which is an example of a virtual computer management program stored in the physical memory 31. The hypervisor 20 comprises a virtual computer boot-up processing part 94, a virtual computer termination processing part 95, a hypervisor initialization processing part 96, and a virtual computer resource management part 60. The virtual computer boot-up processing part 94, the virtual computer termination processing part 95, the hypervisor initialization processing part 96, and the virtual computer resource management part 60 are configured in accordance with the physical CPU 30 executing a program stored in the physical memory 31. The virtual computer boot-up processing part 94 executes processing when a virtual computer is booted up. The virtual computer termination processing part 95 executes processing when the virtual computer is terminated. The hypervisor initialization processing part 96 executes processing when the hypervisor is booted up. The virtual computer resource management part 60 manages a physical machine resource allocated to a virtual computer.

A management virtual computer 50, and user virtual computers 51 (user virtual computer 1) and 52 (user virtual computer 2) run on the hypervisor 20.

The management virtual computer 50 is a virtual computer configured in accordance with the physical CPU 30 executing a program stored in the physical memory 31, and comprises a logical CPU 73, a guest memory 74, and a PF port logical IO 75 as logical resources 72.

A guest OS 71 runs on the management virtual computer 50. A PF port driver 76 for using the PF port 40 and so forth is incorporated in the guest OS 71. Resident management software 70 runs on the guest OS 71.

The user virtual computer 51 is a virtual computer, which is configured in accordance with the physical CPU 30 executing a program stored in the physical memory 31, and comprises a logical CPU 83, a guest memory 84, and a VF port logical IO 85 as logical resources 82. A guest OS 80 runs on the user virtual computer 51. A VF port driver 81 for using the VF ports 41 and 42 is incorporated in the guest OS 80. The other user virtual computer 52 is the same configuration.

Figure 2:
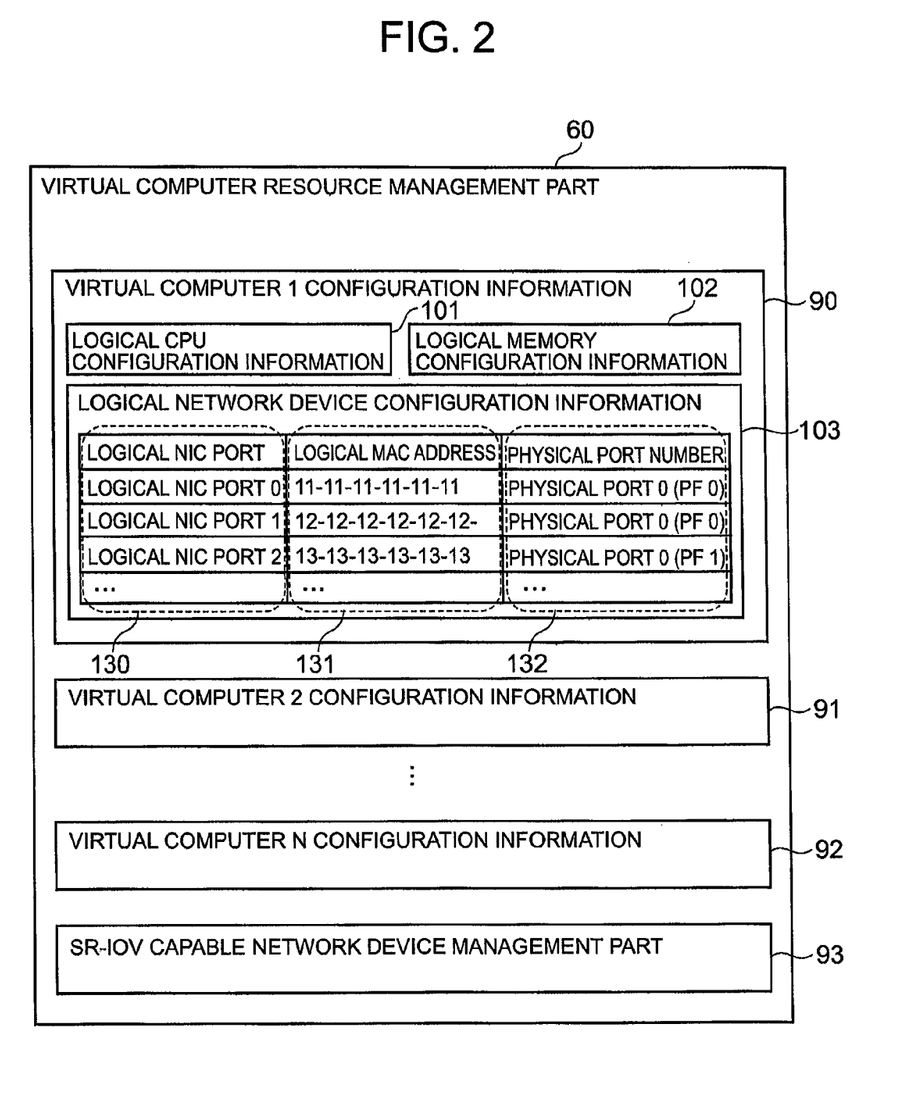
FIG. 2 is a block diagram of a virtual computer resource management part related to the example.

FIG. 2 is a block diagram of a virtual computer resource management part related to the example.

The virtual computer resource management part 60 holds the SR-IOV capable network device management part 93, and configuration information on multiple virtual computers, i.e. virtual computer 1 configuration information 90, virtual computer 2 configuration information 91, . . . , and virtual computer N configuration information 92.

The virtual computer 1 configuration information 90 includes logical CPU configuration information 101, logical memory configuration information 102, and logical network device configuration information 103 with respect to the virtual computer 1. The logical network device configuration information 103 holds the corresponding relationships between a logical network port (logical NIC port) 130 of the corresponding virtual computer, a logical MAC address 131 used in the relevant logical NIC port, and a physical network port number (physical port number: PF port number) 132 used by the corresponding logical NIC port. Furthermore, each logical MAC address is a MAC address, which does not duplicate another logical MAC address managed in the virtual computer system 10. The virtual computer configuration information (virtual computer 2 configuration information 91, and virtual computer N configuration information 92) of the other virtual computer is the same configuration.

Figure 3:
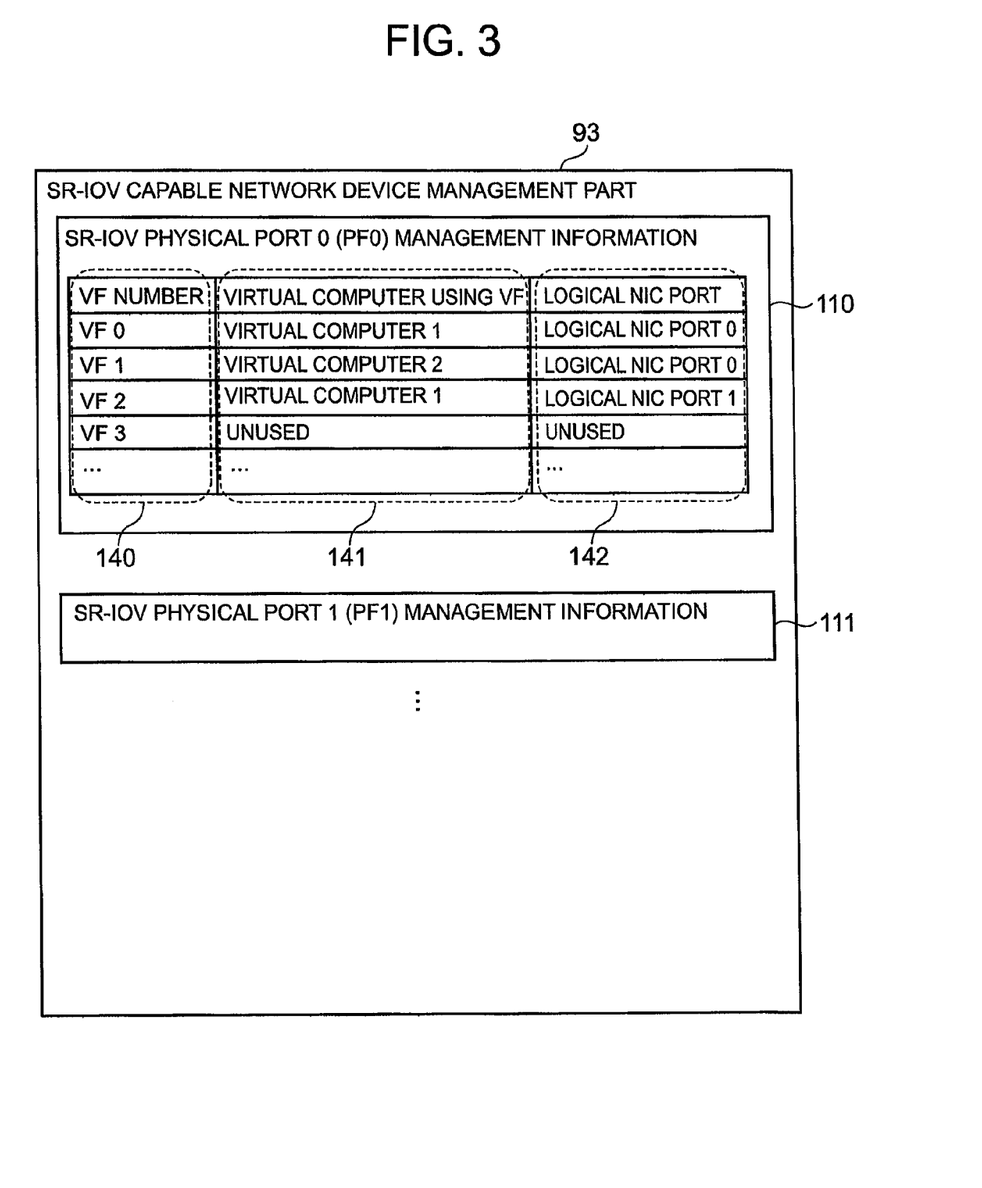
FIG. 3 is a block diagram of an SR-IOV capable network device management part related to the example.

FIG. 3 is a block diagram of an SR-IOV capable network device management part related to the example.

The SR-IOV capable network device management part 93 stores SR-IOV physical port management information (SR-IOV physical port 0 (PF 0) management information 110, SR-IOV physical port 1 (PF 1) management information 111, . . . ) for each physical communication port (PF port) of the SR-IOV capable network device 33, which exists physically.

The SR-IOV physical port 0 (PF 0) management information 110 is the management information of the physical communication port 0 (PF 0), and associatively holds a VF port number 140 showing a VF port, a number 141 of the virtual computer, which uses this VF port, and a number 142 of the logical NIC port associated with this virtual computer for each virtual communication port (VF port) 41, 42, . . . of the relevant physical communication port. The SR-IOV physical port management information (111, and so forth) of the other physical communication port is the same configuration.

For example, according to the SR-IOV physical port 0 (PF 0) management information 110 of FIG. 3, it is clear that the VF port "VF 0" of the PF port "PF 0" is used as the "logical NIC port 0" of the "virtual computer 1", the VF port "VF 1" of the PF port "PF 0" is used as the "logical NIC port 0" of the "virtual computer 2", the VF port "VF 2" of the PF port "PF 0" is used as the "logical NIC port 1" of the "virtual computer 1", and the VF port "VF 3" of the PF port "PF 0" is "unused".

Next, processing operations in the virtual computer system 10 will be explained.

Figure 4:
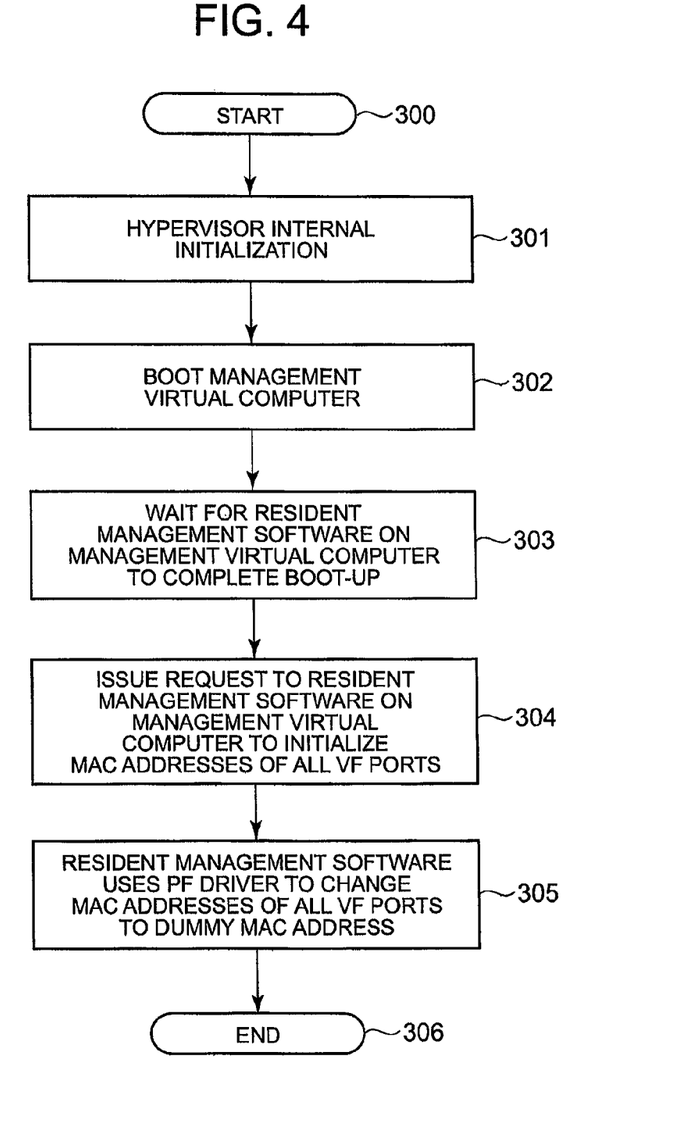
FIG. 4 is a flowchart of a hypervisor initialization process related to the example.

FIG. 4 is a flowchart of a hypervisor initialization process when booting up a hypervisor related to the example.

The hypervisor initialization process is executed by the hypervisor initialization processing part 96. When the hypervisor 20 is booted up by the physical CPU 30, first of all, the hypervisor 20 invokes the hypervisor initialization module 96. When the hypervisor initialization processing part 96 is invoked (Step 300), first initialization processing is performed for various types of internal data inside the hypervisor 20 (Step 301).

Next, the hypervisor initialization processing part 96 boots up the management virtual computer 50. The booted management virtual computer 50 automatically boots up the guest OS 71 and, in addition, the resident management software 70, which runs thereon (Step 302).

The hypervisor initialization processing part 96 waits until the management virtual computer 50 has finished booting up the resident management software 70 (Step 303), and when the resident management software 70 boots up, issues the resident management software 70 a request to initialize the MAC addresses of all the VF ports of the SR-IOV capable network device 33 (Step 304).

As a method for requesting a task from the hypervisor 20 to the resident management software 70 here, there is (1) polling monitoring by the resident management software 70, that is, the presence or absence of a hypervisor 20 request is checked by either invoking a VM CALL command on a regular basis, or monitoring the contents of a specific memory address or IO port address, and (2) transmitting a request to the resident management software 70 from a virtual device driver triggered by an interrupt of the virtual device allocated to the management virtual computer 50. Either method may be used as long as it is possible to transmit the contents of a hypervisor 20 request to the resident management software 70.

The resident management software 70, which receives the MAC address initialization request, uses the PF driver 76 to configure in the MAC addresses 121 and 122 of all the VF ports 41, 42, . . . a MAC address (a dummy MAC address), which is guaranteed not to be used in the virtual computers 50, 51, 52, . . . being operated in the virtual computer system 10, and the external network apparatus 22 (Step 305), and ends the processing.

In a case where the SR-IOV capable network device 33 is configured such that a unique MAC address, which is guaranteed not be a duplicate, is configured in all the VF ports, it is possible to use the MAC address configured in these VF ports as the dummy MAC address. Therefore, the processing shown in Steps 304 and 305 can be omitted in this case.

Alternatively, in a case where the SR-IOV capable network device 33 is configured such that random numbers are used to configure the VF port MAC addresses 121, 122, . . . when the power is turned ON, there is no guarantee that the MAC addresses configured in this way will not be redundant, and as such, these MAC addresses cannot be used as the dummy MAC address. In accordance with this, a unique MAC address (for example, may be a single MAC address), which is guaranteed not to be a duplicate, is prepared, and this unique MAC address is configured for all the VF port MAC addresses 121, 122, . . . in accordance with Steps 304 and 305 described hereinabove.

Figure 7:
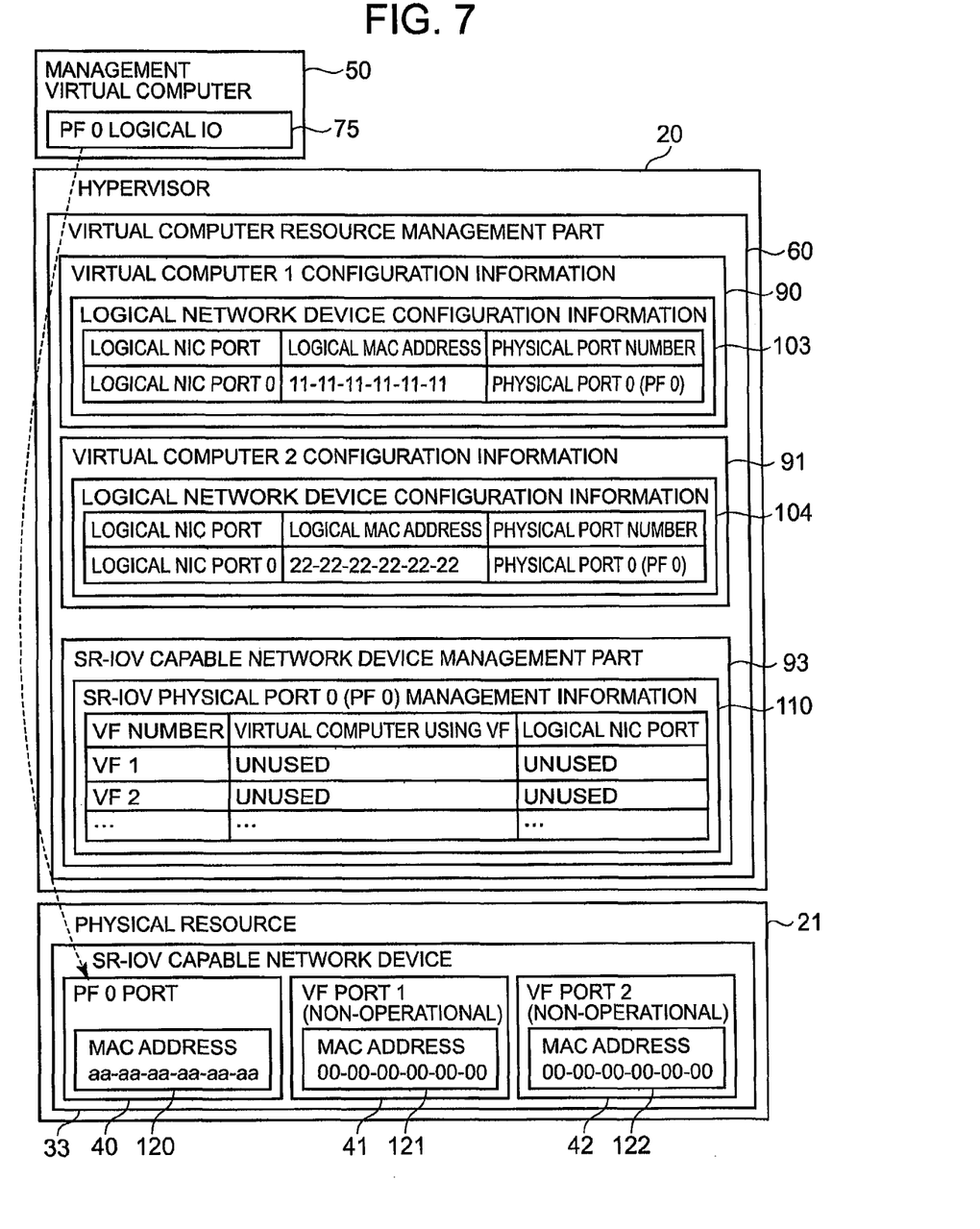
FIG. 7 is a diagram illustrating an example of a configuration state of the SR-IOV capable network device at hypervisor boot-up.

FIG. 7 is a diagram illustrating an example of a configuration state of the SR-IOV capable network device at hypervisor boot-up. FIG. 7 shows the configuration state of the MAC addresses in the virtual computer system 10 when the hypervisor initialization process shown in FIG. 4 has ended.

As shown in FIG. 7, the VF ports 41 and 42 of the SR-IOV capable network device 33 are not in operation, and a dummy MAC address (for example, 00-00-00-00-00-00) is configured in the MAC addresses 121 and 122 of these VF ports 41 and 42.

Next, a virtual computer boot-up time process for booting up the user virtual computer in accordance with primarily running the virtual computer boot-up processing part 94 of the hypervisor 20 in the post-hypervisor initialization process virtual computer system 10 will be explained.

Figure 5:
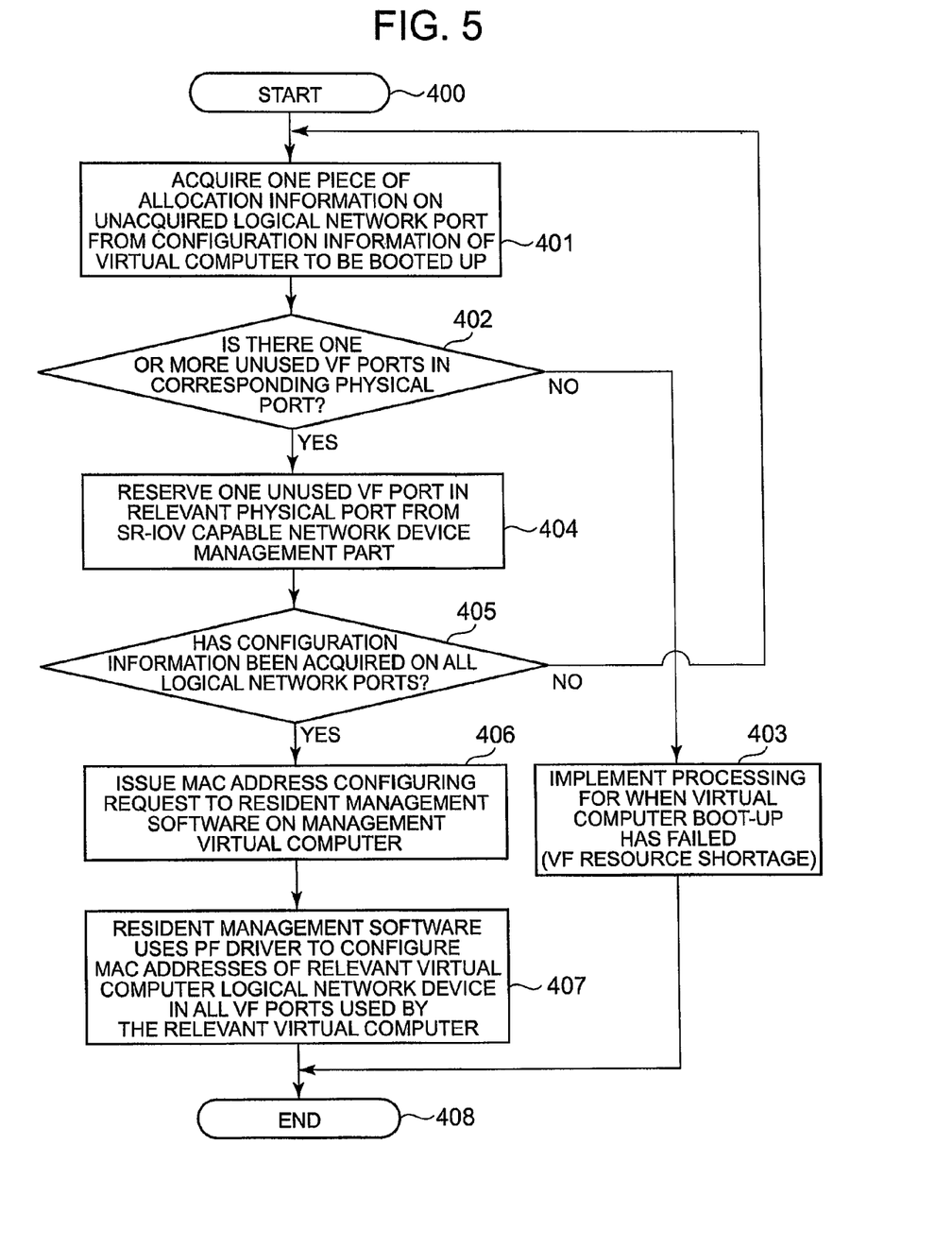
FIG. 5 is a flowchart of virtual computer boot-up time processing related to the example.

FIG. 5 is a flowchart of the virtual computer boot-up time processing related to the example.

The virtual computer boot-up processing part 94 is instructed by the hypervisor 20 to boot up the user virtual computer (Step 400), and the virtual computer boot-up processing part 94 first reads the virtual computer configuration information (90, 91, ... , or 92) corresponding to the virtual computer to be booted up. Next, the virtual computer boot-up processing part 94 references the logical network device configuration information 103 within the virtual computer configuration information, and selects one of the logical NIC ports 130 to be allocated to the relevant virtual computer (Step 401).

Next, the virtual computer boot-up processing part 94 reads and specifies the physical port number 132 of the physical SR-IOV capable network device 33 used by the selected logical NIC port 130 from the logical network device configuration information 103. In addition, the virtual computer boot-up processing part 94 reads the SR-IOV physical port management information (any of 110, 111, ... ) corresponding to the physical port number 132, and checks whether there is an unused VF port, which the virtual computer is not using, in this physical communication port (PF port) (Step 402).

In a case where the result is that an unused VF port does not exist (Step 402: No), it is not possible to provide virtual network devices in the amount requested by the virtual computer, and as such, the virtual computer boot-up process is ended abnormally due to a shortage of VF port resources (Step 403).

Alternatively, in a case where an unused VF port exists (Step 402: Yes), one unused VF port is selected, and the content of the SR-IOV physical port management information 110 is changed from a value showing that the number 141 of the virtual computer using the selected VF port is unused to the value of the number of the virtual computer for which the boot-up process is currently being performed (Step 404).

Next, the virtual computer boot-up processing part 94 determines whether or not the configuration information for all the logical NIC ports in the logical network device configuration information 103 has been acquired (Step 405), and in a case where the information for all the logical NIC ports 130 has not been acquired (Step 405: No), advances the processing to Step 401 and repeats the processing the number of times required for the number of logical NIC ports to be allocated to this virtual computer.

Alternatively, in a case where the information of all the logical NIC ports 130 has been acquired (Step 405: Yes), the VF port used by all the logical NIC ports is established. Thus, the virtual computer boot-up processing part 94 issues a request to the resident management software 70 on the management virtual computer 50 to change the MAC address (for example, 121) of the VF port (for example, 41) used by the SR-IOV capable network device 33 virtual computer (Step 406).

The resident management software 70, which receives the hypervisor 20 instruction, executes a command for the PF driver 76 to configure a MAC address (for example, 121) for the specified VF port (for example, 41) in accordance with the instruction (Step 407). In accordance with this, by means of the PF driver 76 the MAC address (for example, 121) of the VF port (for example, 41) is configured to the value of the MAC address (that is, the value of the logical MAC address 131) used by the virtual computer, which has been booted up.

Figure 8:
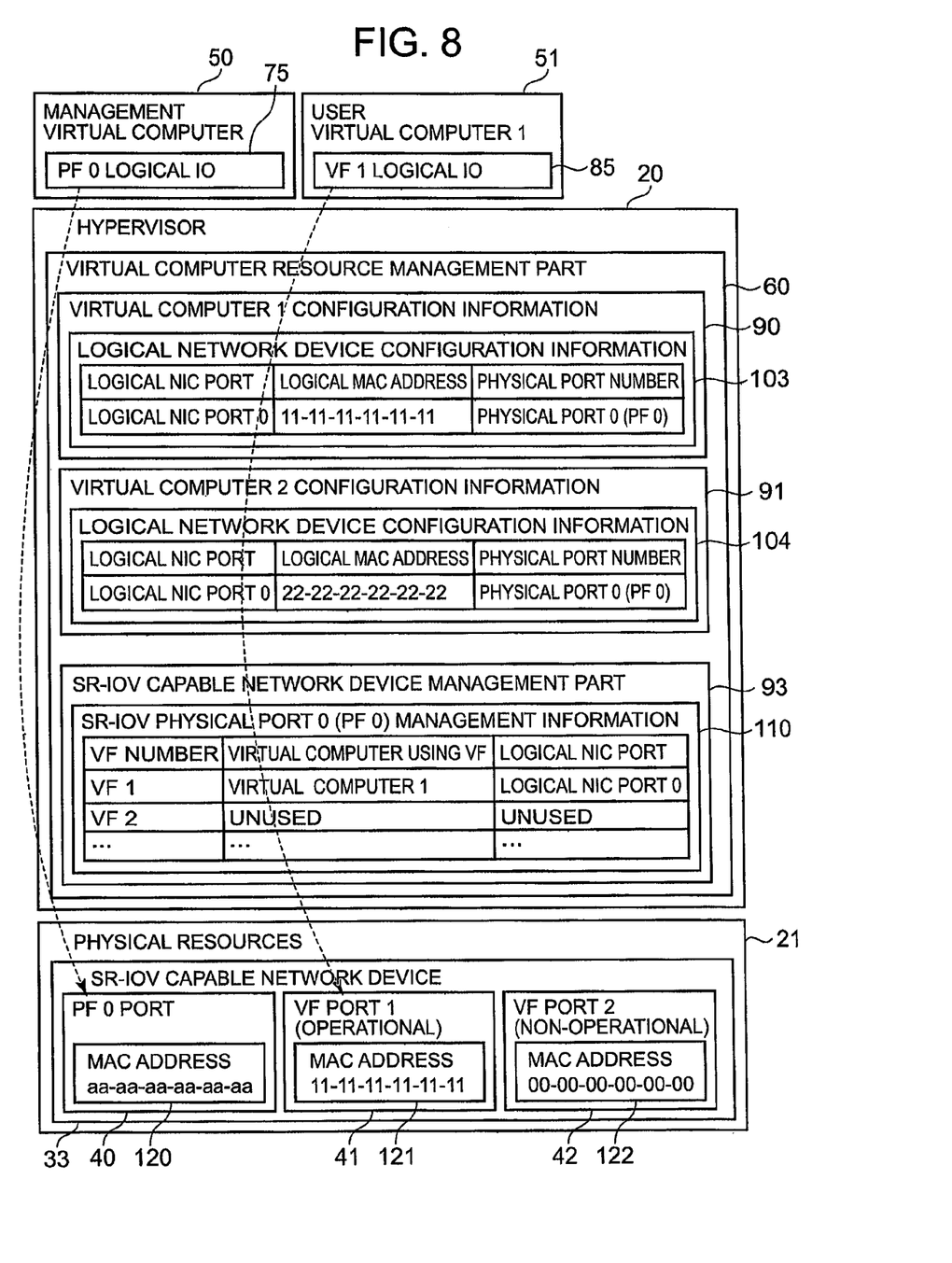
FIG. 8 is a diagram illustrating an example of the configuration state of the SR-IOV capable network device when booting up a single virtual computer.

When the above-described virtual computer boot-up time processing is executed, the configuration state of the MAC addresses of the virtual computer system 10 transitions from the state shown in FIG. 7 to the state shown in FIG. 8.

That is, when the user virtual computer 1 is booted up, the MAC address (11-11-11-11-11-11 in this drawing) being managed by the virtual computer resource management part 60 of the hypervisor 20 is configured with respect to the VF port 41 allocated to the user virtual computer 1 so as to be used by the user virtual computer 1 as shown in FIG. 8.

When an additional user virtual computer (the user virtual computer 2 here) is booted up here in accordance with the same virtual computer boot-up time process described hereinabove, the configuration state of the MAC addresses of the virtual computer system 10 transitions from the state shown in FIG. 8 to the state shown in FIG. 9.

Figure 9:
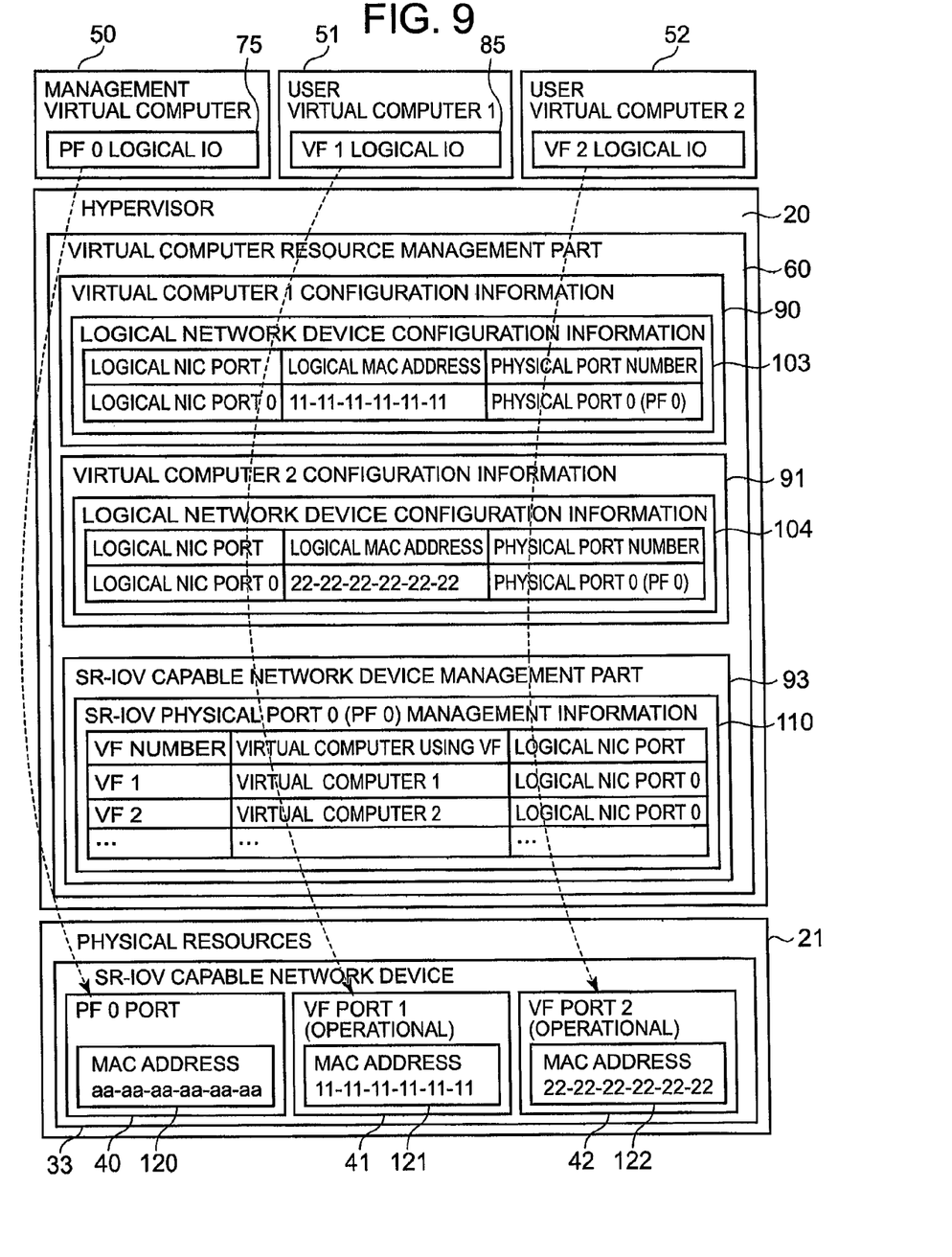
FIG. 9 is a diagram illustrating an example of the configuration state of the SR-IOV capable network device when booting up two virtual computers.

That is, when the user virtual computer 2 is booted up, the MAC address (22-22-22-22-22-22 in this drawing) being managed by the virtual computer resource management part 60 of the hypervisor 20 is configured with respect to the VF port 42 allocated to the user virtual computer 2 so as to be used by the user virtual computer 2 as shown in FIG. 9.

Figure 6:
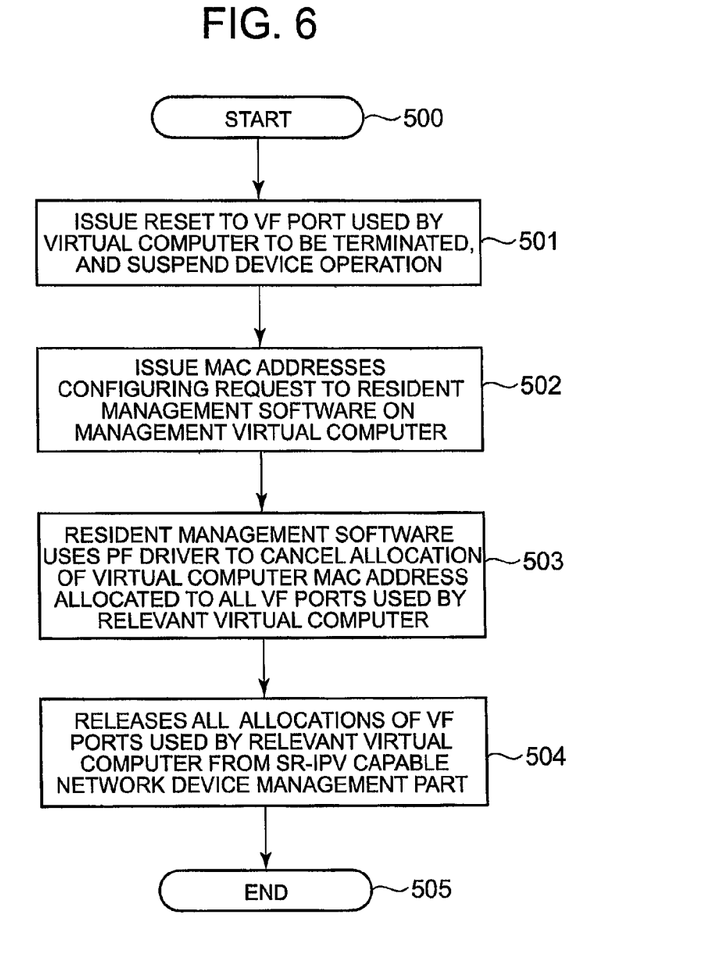
FIG. 6 is a flowchart of virtual computer termination time processing related to the example.

Next, the processing at the time when a booted user virtual computer is terminated will be explained. When terminating a user virtual computer in this virtual computer system 10, the virtual computer termination processing part 95 of the hypervisor 20 performs virtual computer termination time processing such as that shown below in addition to ordinary virtual computer termination processing.

FIG. 6 is a flowchart of the virtual computer termination time processing related to the example.

First, the virtual computer termination processing part 95 issues a reset to the VF port (either 41 or 42), which the user virtual computer (either 51 or 52) being terminated had been using, and completely suspends the operation of the device, which was being used by the relevant user virtual computer (Step 501). The resetting of the SR-IOV capable network device 33 can generally be implemented here by writing "1" in a FLR (Function Level Reset) of the PCI configuration register.

Next, the virtual computer termination processing part 95 issues a MAC address configuring request to the resident management software 70 on the management virtual computer 50 (Step 502).

The resident management software 70, which receives this request, uses the PF driver 76 to cancel the allocation of the user virtual computer MAC address allocated to all the VF ports (41, 42, and so forth) used by the corresponding user virtual computer (either 51 or 52), and to configure the MAC address to a dummy MAC address (Step 503).

Next, the virtual computer termination processing part 95 releases all the allocations of the VF ports (41, 42, and so forth), which had been used by the corresponding user virtual computer (either 51 or 52), from the SR-IOV capable network device management part 93 (Step 504), and ends the processing (Step 505).

Virtual computer termination time processing such as this makes it possible to change the MAC address being used when the user virtual computer (51, 52) was terminated to a dummy MAC address.

For example, when two user virtual computers (51, 52) have been booted up as in FIG. 9, the configuration state of the MAC addresses of the virtual computer system 10 transitions to the state shown in FIG. 8 when the user virtual computer 52 is suspended in accordance with the virtual computer termination time process. That is, the MAC address 122 of the VF port 42 (VF port 2) being used by the user virtual computer 2 transitions from 22-22-22-22-22-22 to 00-00-00-00-00-00.

The effects of changing and configuring the MAC address of the VF port, which had been used in the user virtual computer to be terminated, to a dummy MAC address in the virtual computer termination time process will be explained in detail here.

Figure 10:
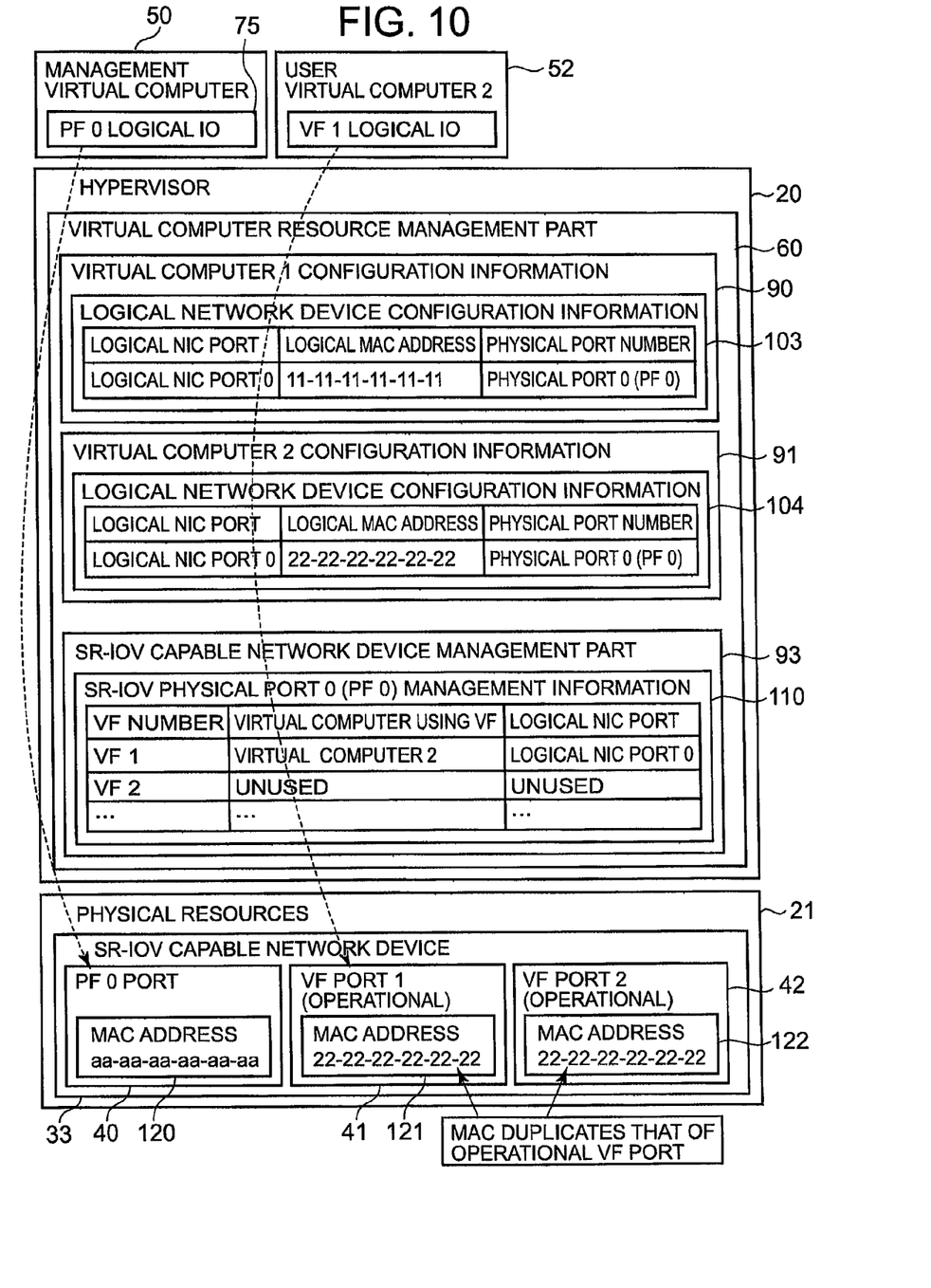
FIG. 10 is a diagram illustrating a situation, which occurs when a MAC address configuration is not canceled.

For example, as shown in FIG. 9, it is supposed that when two user virtual computers (51, 52) have been booted up, the MAC address of the VF port 2 used by the user virtual computer 2 remains 22-22-22-22-22-22 as-is when the user virtual computer 2 is suspended. Thereafter, when the user virtual computer 1 is terminated and the user virtual computer 2 is booted up once again, the free VF port 1 is allocated to the user virtual computer 2 and 22-22-22-22-22-22 is configured as the MAC address 121 of the VF port 1 as shown in FIG. 10. In accordance with this, the MAC address 122 of the non-operational VF port 2 duplicates the MAC address 121 of the VF port 1.

Thus, when multiple MAC addresses in different VF ports duplicate one another, there is the danger that a network packet sent from the external network apparatus 22 to the operational MAC address 121 (that is, 22-22-22-22-22-22) of the SR-IOV capable network device 33 will be routed by the network switch 43 inside the device to the non-operational VF port 42 having the same MAC address, giving rise to a situation in which communications with the external network apparatus 22 cannot be carried out normally using the operational VF port 41.

Since a situation like this occurs, even though a VF port is not in operation, the MAC address of this non-operational VF port must be prevented from duplicating the MAC address of an operational VF port. In the virtual computer termination time process described above, since the virtual computer termination processing part 95 changes the MAC address of the VF port in use to a dummy MAC address when the virtual computer is terminated, it is possible to appropriately prevent the MAC address of a non-operational VF port from duplicating the MAC address of an operational VF port.

One example has been explained hereinabove, but it goes without saying that the present invention is not limited to this example, and that various changes can be made without departing from the gist thereof.

For example, in the above-described example, the management virtual computer 50 configures the MAC addresses of the VF ports 41, 42, . . . of the SR-IOV capable network device 33, but the present invention is not limited to this, and the hypervisor 20 may configure the MAC address of a VF port of the SR-IOV capable network device 33, and the PF driver 76 may be incorporated in the hypervisor 20 in accordance with this.

What is claimed is:

1. A virtual computer system, to operate multiple virtual computers, comprising:
    a network device which has multiple physical communication ports capable of coupling to an external network apparatus via a network;
    a storage device;
    a control device, which is coupled to the network device and the storage device; and
    a hypervisor configured to manage multiple network logical ports which are provided to the virtual computers,
    wherein the network device is configured to have multiple virtual communication ports capable of being provided to the virtual computers with respect to a single one of the physical communication ports,
    wherein the storage device is configured to store, for each of the physical communication ports, network device management information that indicates a corresponding relationship between the virtual communication ports and a use status of the virtual communication ports, and, for each of the virtual computers, virtual computer configuration information that indicates a corresponding relationship between the network logical ports and MAC addresses allocated to the network logical ports, and
    wherein the control device, is configured to execute, based on the network device management information and the virtual computer configuration information, when a first virtual computer of the virtual computers is booted up:
    selecting an unused first virtual communication port from the virtual communication ports provided by the network device,
    associating the first virtual communication port of the virtual communication ports with a first network logical port of the network logical ports that the hypervisor provides to the first virtual computer, and
    associating a MAC address allocated to the first network logical port with the first virtual communication port, and
    wherein the control device is further configured to execute, when the first virtual computer is terminated:
    associating a dummy MAC address, which is a MAC address that is guaranteed not to be used in the external network apparatus, as the MAC address of the first virtual communication port.

2. A virtual computer system according to claim 1, wherein the control device is further configured to execute:
    associating the dummy MAC address with all of the virtual communication ports when any of the virtual computers is booted up.

3. A virtual computer system according to claim 2, wherein the hypervisor manages the MAC addresses allocated to the network logical ports.

4. A virtual computer system according to claim 1, wherein the control device is further configured to execute, based on the network device management information and the virtual computer configuration information, when the first virtual computer of the virtual computers is booted up:
    selecting an unused second virtual communication port from the virtual communication ports provided by the network device,
    associating a second virtual communication port of the virtual communication ports with a second network logical port of the network logical ports that the hypervisor provides to the first virtual computer, and
    associating another MAC address allocated to the second network logical port with the second virtual communication port, the other MAC address being different from the MAC address allocated to the first network logical port.

5. A MAC address management method executed by a virtual computer system to operate multiple virtual computers, the virtual computer system including a network device which has multiple physical communication ports capable of coupling to an external network apparatus via a network, a storage device, a control device coupled to the network device and the storage device, and a hypervisor configured to manage multiple network logical ports which are provided to the virtual computers, and where the network device is configured to have multiple virtual communication ports capable of being provided to the virtual computers with respect to a single one of the physical communication ports, and where the storage device is configured to store, for each of the physical communication ports, network device management information that indicates a corresponding relationship between the virtual communication ports and a use status of the virtual communication ports, and, for each of the virtual computers, virtual computer configuration information that indicates a corresponding relationship between the network logical ports and MAC addresses allocated to the network logical ports, the MAC address management method comprising:

when a first virtual computer of the virtual computers is booted up and based on the network device management information and the virtual computer configuration information:

selecting an unused first virtual communication port from the virtual communication ports provided by the network device, associating the first virtual communication port of the virtual communication ports with a first network logical port of the network logical ports that the hypervisor provides to the first virtual computer, and associating a MAC address allocated to the first network logical port with the first virtual communication port; and when the first virtual computer is terminated:

associating a dummy MAC address, which is unable to be used in communications in the virtual computer system, as the MAC address of the first virtual communication port.

6. The MAC address management method according to claim 5, further comprising:

associating the dummy MAC address with all of the virtual communication ports when any of the virtual computers is booted up.

7. The MAC address management method according to claim 6, wherein the hypervisor manages the MAC addresses allocated to the network logical ports.

8. A MAC address management method executed by a virtual computer system to operate multiple virtual computers, the virtual computer system including a network device which has multiple physical communication ports capable of coupling to an external network apparatus via a network, a storage device, a control device coupled to the network device and the storage device, and a hypervisor configured to manage multiple network logical ports which are provided to the virtual computers, where the network device is configured to have multiple virtual communication ports capable of being provided to the virtual computers with respect to a single one of the physical communication ports, and where the storage device is configured to store, for each of the physical communication ports, network device management information that indicates a corresponding relationship between the virtual communication ports and a use status of the virtual communication ports, and, for each of the virtual computers, virtual computer configuration information that indicates a corresponding relationship between the network logical ports and MAC addresses allocated to the network logical ports, the MAC address management method comprising:

when a first virtual computer of the virtual computers is booted up and based on the network device management information and the virtual computer configuration information:

selecting an unused first virtual communication port from the virtual communication ports provided by the network device, associating the first virtual communication port of the virtual communication ports with a first network logical port of the network logical ports that the hypervisor provides to the first virtual computer, associating a MAC address allocated to the first network logical port with the first virtual communication port, selecting an unused second virtual communication port from the virtual communication ports provided by the network device, associating a second virtual communication port of the virtual communication ports with a second network logical port of the network logical ports that the hypervisor provides to the first virtual computer, and associating another MAC address allocated to the second network logical port with the second virtual communication port, the other MAC address being different from the MAC address allocated to the first network logical port; and when the first virtual computer is terminated:

associating a dummy MAC address, which is unable to be used in communications in the virtual computer system, as the MAC address of the first virtual communication port.

* * * * *